United States Patent
Nomula

(10) Patent No.: US 7,364,779 B2
(45) Date of Patent: Apr. 29, 2008

(54) EASY-OPENING HIGH BARRIER PLASTIC CLOSURE AND METHOD THEREFOR

(75) Inventor: Srinivas Nomula, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 77 days.

(21) Appl. No.: 10/653,584

(22) Filed: Sep. 2, 2003

(65) Prior Publication Data
US 2005/0048233 A1 Mar. 3, 2005

(51) Int. Cl.
*B32B 7/06* (2006.01)
*B65D 43/02* (2006.01)

(52) U.S. Cl. .......... 428/36.7; 428/36.6; 428/35.4; 220/265; 220/270; 493/129; 493/133; 53/477; 53/478

(58) Field of Classification Search ........ 428/36.6, 428/36.7, 35.4; 220/265, 270; 493/129, 493/133; 53/477, 478
See application file for complete search history.

(56) References Cited

U.S. PATENT DOCUMENTS

| | | | |
|---|---|---|---|
| 4,403,710 A * | 9/1983 | Hirota et al. ............... 220/270 |
| 4,472,485 A | 9/1984 | Tabuse et al. |
| 4,537,305 A * | 8/1985 | Takanashi ................. 206/438 |
| 4,561,920 A | 12/1985 | Foster |
| 4,726,984 A | 2/1988 | Shah |
| 4,880,706 A | 11/1989 | Mazuera et al. |
| 4,937,139 A | 6/1990 | Genske et al. |
| 4,999,229 A | 3/1991 | Moritani et al. |
| 5,004,647 A | 4/1991 | Shah |
| 5,049,449 A | 9/1991 | Ofstein |
| 5,069,946 A | 12/1991 | Moritani et al. |
| 5,137,763 A * | 8/1992 | Bauer et al. ............... 428/36.7 |
| 5,145,737 A * | 9/1992 | Boiron et al. .............. 428/334 |
| 5,160,767 A | 11/1992 | Genske et al. |
| 5,238,718 A | 8/1993 | Yano et al. |
| 5,273,797 A | 12/1993 | Hazelton et al. |
| 5,353,943 A * | 10/1994 | Hayward ................... 220/276 |
| 5,449,552 A | 9/1995 | Bochow et al. |
| 5,820,956 A | 10/1998 | Hatakeyama et al. |
| 6,056,141 A | 5/2000 | Navarini et al. |
| 6,083,587 A | 7/2000 | Smith et al. |
| 6,182,850 B1 | 2/2001 | Marbler et al. |
| 6,224,973 B1 * | 5/2001 | Trouilhet ................... 428/340 |
| 6,361,843 B1 | 3/2002 | Smith et al. |
| 6,372,359 B1 | 4/2002 | Hayashi et al. |
| 6,383,583 B1 | 5/2002 | Ninomiya et al. |
| 6,503,588 B1 | 1/2003 | Hayashi et al. |
| 6,531,198 B2 | 3/2003 | Lind et al. |
| 2002/0068140 A1 | 6/2002 | Finkelstein et al. |

FOREIGN PATENT DOCUMENTS

JP 401058675 A 3/1989

* cited by examiner

*Primary Examiner*—William P Watkins, III
(74) *Attorney, Agent, or Firm*—Alston & Bird LLP

(57) ABSTRACT

A plastic, easy-opening closure for a retortable container and a method for sealing are provided. The closure includes a plastic membrane having an outer layer of polypropylene, a first tie layer, an intermediate layer formed of EVOH, a second tie layer, an inner layer formed of polypropylene, and a peel-seal layer. The peel-seal layer can be formed of high density polyethylene or polypropylene with a contaminant dispersed therein so that the closure can be easily removed from the container for opening.

8 Claims, 1 Drawing Sheet

EASY-OPENING HIGH BARRIER PLASTIC CLOSURE AND METHOD THEREFOR

BACKGROUND OF THE INVENTION

1) Field of the Invention

This invention relates to a multilayer, plastic, easy-opening closure for hermetic sealing of an open end of a retortable container.

2) Description of Related Art

A variety of closures are known for the hermetic sealing of a container, such as conventional tin-plated steel cans that are widely used for containing food products. Retortable containers are those that can withstand a pasteurization or retort process comprising heat and pressure for preserving the food contents of the container. During retort, the container can be subjected to temperatures above 212° F. and up to 250° F. under pressures of 15 to 30 psi.

Easy-opening containers are those that can be opened without undue effort and without the use of a special tool such as a rotary can opener. In order for an easy-opening container to be retortable, the closure must be sufficiently strong to resist stresses that develop as a result of the retort heat and pressure, and yet the bond between the closure and container must be easily overcome during opening. One conventional easy-opening, retortable container includes a closure that is stronger in shear than tension. The closure is strong enough to withstand the shear force that develops during retort, while a relatively small tensile force is required to open the container. For example, U.S. Pat. No. 5,752,614, titled "Easy-Opening Closure for Hermetic Sealing a Retortable Container," to Nelson describes an easy-opening closure that includes a metal end ring that can be seamed to an open end of a retortable container and defines a central opening that is covered by a membrane patch. The membrane patch is bonded to the end ring such that the bond is unaffected during retort processing but has a predetermined tensile force strength that is preferably less than 14 pounds to allow peeling of the membrane patch from the end ring. Thus, the container can be retorted and subsequently easily opened.

Other easy open containers are formed partially or wholly of plastic. For example, a lid that includes a metallic foil can be adhered to a plastic container, which can be used for retort. The adhesive used to bond the foil to the container can be a glue bond that is strong enough to withstand retort but easily overcome when a consumer or other user peels the foil from the container. Attempts have also been made to manufacture retortable containers exclusively of plastic. For example, a plastic membrane can be heat-sealed to a plastic container. Alternatively, the plastic membrane can be heat-sealed to a plastic end ring that is similar to the metal end ring described by Nelson, and the plastic end ring can be fusion bonded to the container by spin welding. Such bonds can be difficult to form by heat-sealing due to the poor thermal conductivity of the plastic. If the strength of the bond is not controlled precisely, the bond may be insufficiently strong to resist the stresses that are applied during retort or too strong for a user to overcome in order to open the container. Further, the heat required for heat-sealing can affect the color or the contour of the plastic membrane, thereby detracting from the aesthetic appeal of the container.

Thus, there exists a need for a plastic, easy-opening closure for hermetically sealing an open end of a retortable container and an easy-opening container that is hermetically sealed by such a closure. The closure should be strong enough to withstand the stresses induced during retort, but easily removed by a user.

BRIEF SUMMARY OF THE INVENTION

The present invention provides an easy-opening, retortable container and a closure and method for sealing such a container. The closure has an outer polypropylene layer, an intermediate EVOH layer, and an inner polypropylene layer, which are adhered by tie layers. A peel-seal layer disposed on the inside of the inner layer is configured to be heat-sealed to the container and structured to provide a bond of controlled strength between the closure and the container. Thus, the closure can be peeled from the container with a predetermined force. For example, the peel-seal layer can have a shear force strength of at least about 20 psi and a tensile force strength of less than about 14 pounds.

According to one embodiment of the present invention, the peel-seal layer is formed of polypropylene in which there is dispersed a contaminant such as talc, calcium carbonate, or high density polyethylene. Alternatively, the peel-seal layer can be a thin layer of high density polyethylene. The layers can be coextruded, and the closure can be ultrasonically or otherwise heat-sealed to the container. Oxygen scavengers can be provided in one or more of the layers, and a grip portion can be provided to facilitate removal of the closure from the container.

Thus, the present invention provides a plastic closure that can be used to hermetically seal a retortable container, which can also be formed of plastic. The peel-seal layer can provide a bond of controlled strength between the closure and the container so that the closure can be easily opened by a user.

BRIEF DESCRIPTION OF THE SEVERAL VIEWS OF THE DRAWINGS

Figure 1:
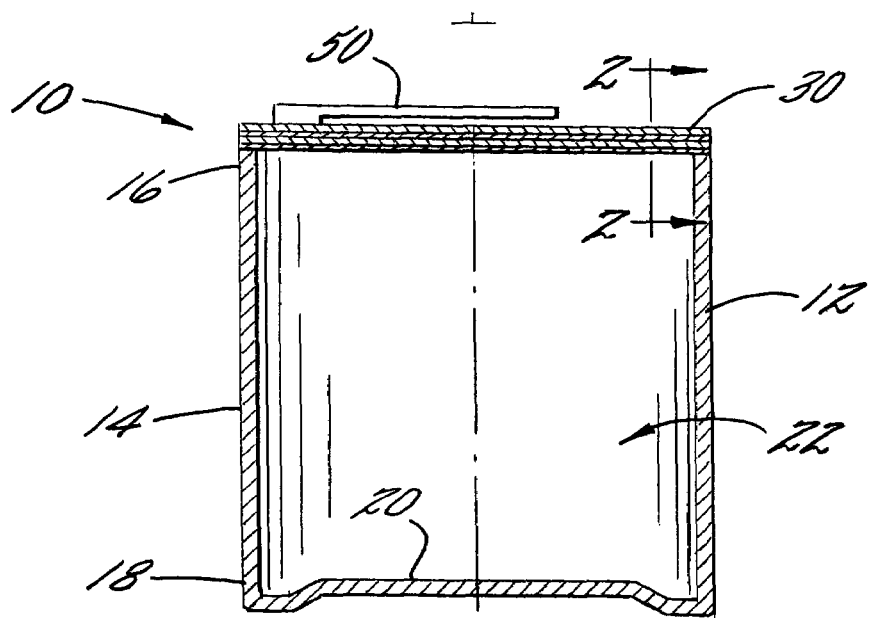
Figure 2:
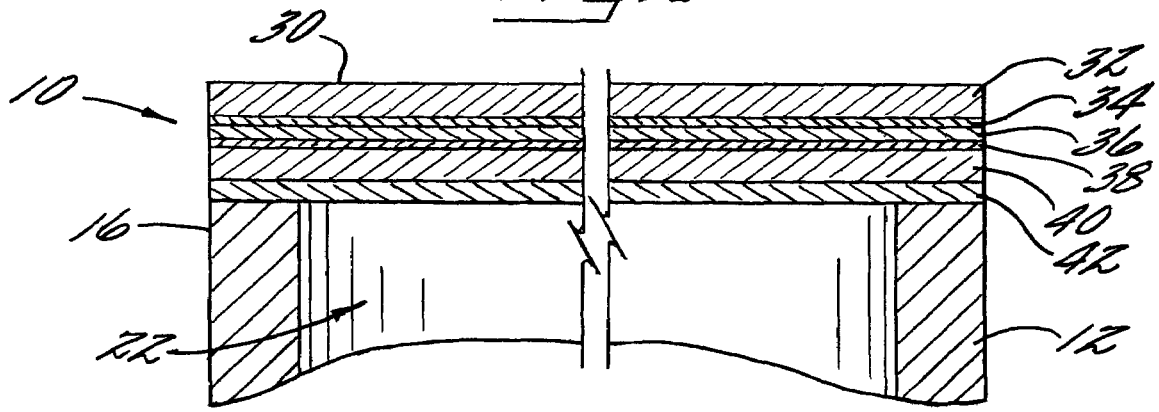
Figure 3:
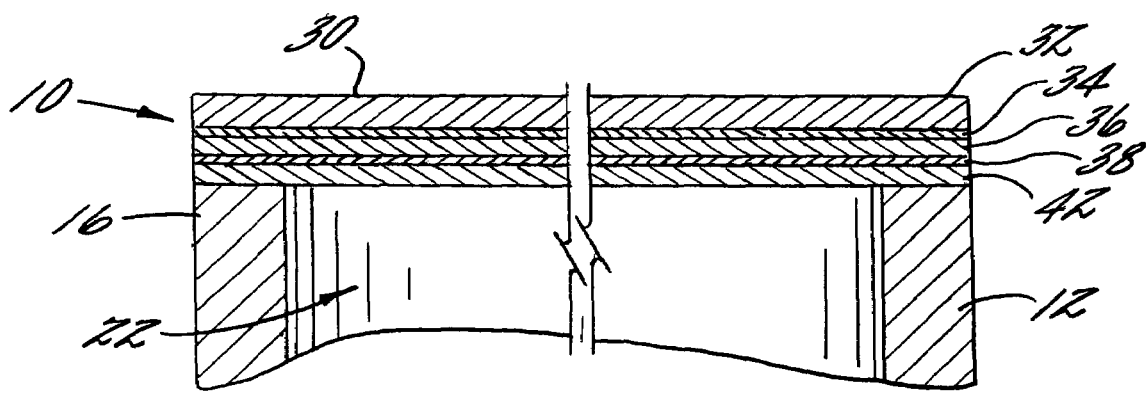

Having thus described the invention in general terms, reference will now be made to the accompanying drawings, which are not necessarily drawn to scale, and wherein:

FIG. 1 is a section view illustrating a container with a closure according to one embodiment of the present invention;

FIG. 2 is a partial section view illustrating the closure of FIG. 1 as indicated by line 2-2 of FIG. 1; and FIG. 3 is a partial section view illustrating a closure according to another embodiment of the present invention.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Referring now to FIGS. 1 and 2, there is shown an easy-opening container 10 according to one embodiment of the present invention. The container 10 has a base portion 12, which defines an openable first end 16 that is closed by a closure 30, e.g., a removable lid. Preferably, the base portion 12 is formed of one or more polymers. For example, the base portion 12 can be formed of a multilayer structure with layers of polypropylene, ethylene vinyl alcohol (EVOH), polyethylene, and the like.

In the illustrated embodiment, the base portion 12 includes a continuous cylindrical side 14 that extends longitudinally from the openable first end 16 to a second end 18, which is closed by a bottom 20. The side 14 can alternatively comprise other configurations, for example, multiple rectangular panels configured at right angles so that the base portion 12 has a square cross section instead of circular as shown. The bottom 20 can be formed separately from the side 14 and joined thereto, for example, by crimping, welding, gluing, and the like. Alternatively, the side 14 and the bottom 20 can be formed as a unitary member as shown in FIG. 1, for example, by thermoforming a multilayer high-barrier sheet, or by co-extrusion blow molding the side 14 and bottom 20 of plastic. Additionally, the side 14 can have a tapered shape, such as a conical shape, that includes the bottom 20.

The openable first end 16 is closed by the closure 30 such that the base portion 12 and the closure 30 define an interior space 22 therein, which can be hermetically sealed. As shown in FIG. 1, the closure 30 can be connected to the side 14 of the base portion 12. Alternatively, however, the base portion 12 can also include an end ring that extends radially inward from the side 12 to define an opening that is smaller than the diameter of the side 14 at the first end 16. Such end rings are known in the art, as are various methods of connecting the end ring to the base portion, such as by forming a double seam around the circumference of the openable end 16.

The closure 30 can be a generally planar membrane that covers the openable end 16. The closure 30 is a multilayer structure, which can be formed by coextruding the layers to form a multilayer sheet and then cutting the sheet to the desired size and shape of the closure 30, for example, using a die. As shown in FIG. 2, the closure 30 can comprise an outer layer 32, i.e., directed away from the interior space 22 of the container 10, which is formed of polypropylene. Polypropylene provides a barrier that generally prevents the transmission of moisture therethrough. Disposed on the interior surface of the outer layer is a first tie layer 34. The first tie layer 34 adheres the outer layer 32 to an intermediate layer 36. The tie layer 34 can be formed of an adhesive resin such as Admer® QF500A, a registered trademark of Mitsui Chemicals, Inc. The intermediate layer 36 can be formed of EVOH, which provides a barrier generally preventing the transmission of gases such as air through the closure 30. A second tie layer 38 is disposed on the intermediate layer 36 opposite the first tie layer 34. The second tie layer 38, which can be formed of the same or similar adhesive resins as the first tie layer 34, adheres an inner layer 40 to the intermediate layer 36. The inner layer 40 can be formed of polypropylene, which can provide a further moisture barrier to the closure 30. Further, chemical compounds that absorb oxygen, referred to generally as oxygen scavengers, can be disposed in the layers 32, 34, 36, 38, 40 to prevent the transmission of oxygen through the lid. For example, a moisture-activated, iron oxide-based oxygen scavenger can be used.

A peel-seal layer 42 is disposed on the inner layer 40 and directed toward the interior space 22 of the container 10. The base portion 12 defines a surface, e.g., circumferentially around the openable first end 16, that has a heat-sealable surface such as polypropylene thereon. The peel-seal layer 42 is structured to be heat-sealed to the base portion 12 of the container 10 so that the closure 30 can be removed from the container 10 by the user. For example, the peel-seal layer 42 can be polypropylene in which a contaminant such as talc, calcium carbonate, or high density polyethylene is dispersed. The contaminant reduces the strength of the heat-seal bond provided by the peel-seal layer 42 between the base portion 12 and the closure 30. Generally, the bond becomes weaker as the proportion of the contaminant in the polypropylene is increased. For example, in one embodiment of the present invention, the peel-seal layer 42 is polypropylene with a content of between about 20% and 50% talc by weight. Alternatively, the peel-seal layer can be a thin layer of high density polyethylene that is disposed on the inner layer 40. The strength of the heat-seal bond in this case is dependent on the thickness of the HDPE layer, i.e., the thicker the layer, the weaker the bond.

In either case, the peel-seal layer 42 can be a heat-sealable layer for bonding the closure 30 to the body portion 12 of the container 10. For example, the closure 30 can be ultrasonically sealed to the body portion 12 by urging the closure 30 against the body portion 12 in the desired configuration and directing ultrasonic energy toward the interface of the closure 30 and body portion 12. The ultrasonic energy induces vibrational motion and, hence, frictional heating at the interface. According to some embodiments of the invention, the material of the closure 30 and the body portion 12 at the interface thereof is heated to a temperature of between about 145° C. and 165° C., thereby plasticizing the material of the closure 30 and the body portion 12 at the interface so that the materials are mixed and bonded. Thus, although the peel-seal layer 42 is illustrated as being distinct from the inner layer 40 and the side 14 of the base portion 12, the material of the peel-seal layer 42 can be mixed with the inner layer 40 and side 14. Further, as illustrated in FIG. 3, the inner layer 40 can be omitted from the closure 30 so that the peel-seal layer 42 is disposed directly on the second tie layer 38.

The closure 30 can provide a hermetic seal to the container 10 such that the container 10 can be used for storing food items and other items requiring a hermetic seal or a reduced or enhanced storage pressure. Preferably, the peel-seal layer 42 provides a bond that is sufficiently strong to withstand the retort process, in which the sealed container 10 is subjected to relatively high temperatures and corresponding internal pressure; however, a person can easily open the container 10 by peeling or otherwise separating the closure 30 from the container 10. For example, the peel-seal layer 42 can provide a bond with a shear force strength of at least about 20 psi and a tensile force strength that is less than about 14 pounds, e.g., between about 6 and 14 pounds. Thus, the peel-seal layer 42 can withstand the stresses applied during retort, but tears when put in tension by the user.

The closure 30 can also include a grip portion such as a pull ring 50 that is disposed on an outer surface of the closure 30 as shown in FIG. 1. Alternatively, the grip portion can be a tab or other feature that can be grasped or otherwise manipulated by a user to open the container 10. The user can grasp the pull ring 50 and urge the pull ring 50 away from the container 10 to thereby break the bond between the closure 30 and the body portion 12 and peel the closure 30 from the container 10. The closure 30 can be partially or entirely removed from the body portion 12 of the container 10 during opening. Further, the material of the peel-seal layer 42 can be removed with the closure 30 and/or left attached to the body portion 12 as the closure 30 is removed.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific That which is claimed:

1. An easy-opening closure for sealing an opening of a retortable container, the closure comprising:
    an outer layer formed of polypropylene;
    a first tie layer disposed on the outer layer;
    an intermediate layer disposed on the first tie layer opposite the outer layer and adhered to the outer layer by the first tie layer, the intermediate layer being formed of EVOH;
    a second tie layer disposed on the intermediate layer opposite the first tie layer;
    an inner layer disposed on the second tie layer opposite the intermediate layer, the inner layer being formed entirely of polypropylene; and
    a peel-seal layer disposed on the inner layer opposite the second tie layer, wherein the peel-seal layer is thinner than the inner layer and is configured to be adhered to the container and structured to provide a bond of controlled strength between the closure and the container such that the closure can be peeled therefrom with a predetermined force.

2. An easy-opening closure according to claim 1 wherein the peel-seal layer is configured to have a shear force strength of at least about 20 psi and a tensile force strength of less than about 14 pounds.

3. An easy-opening closure according to claim 1 wherein the peel-seal layer comprises polypropylene with a contaminant dispersed therein.

4. An easy-opening closure according to claim 3 wherein the contaminant is at least one of the group consisting of talc, calcium carbonate, and high density polyethylene.

5. An easy-opening closure according to claim 1 wherein the peel-seal layer is a layer of high density polyethylene.

6. An easy-opening closure according to claim 1 further comprising oxygen scavengers disposed therein.

7. An easy-opening closure according to claim 1 wherein the outer, intermediate, inner, and peel-seal layers are coextruded layers.

8. An easy-opening closure according to claim 1 wherein the closure is a substantially planar lid defining a grip portion disposed on the outer layer opposite the inner layer.

* * * * *